H. P. BROWN.
METHOD OF AND MEANS FOR PREVENTING THE DISINTEGRATION OF CONCRETE STRUCTURES.
APPLICATION FILED JUNE 8, 1912.

1,230,373.

Patented June 19, 1917.

Witnesses:
Harry G. Fleischer
F. George Barry

Inventor:
Harold P. Brown
By Brown & Seward
his Attorneys

UNITED STATES PATENT OFFICE.

HAROLD P. BROWN, OF MONTCLAIR, NEW JERSEY.

METHOD OF AND MEANS FOR PREVENTING THE DISINTEGRATION OF CONCRETE STRUCTURES.

1,230,373.   Specification of Letters Patent.   Patented June 19, 1917.

Application filed June 8, 1912. Serial No. 702,629.

*To all whom it may concern:*

Be it known that I, HAROLD P. BROWN, a citizen of the United States, and resident of Montclair, in the county of Essex and State of New Jersey, have invented a new and useful Improvement in Methods of and Means for Preventing the Disintegration of Concrete Structures, of which the following is a specification.

My invention relates to a method of and means for preventing the leakage of electrical currents from the usual insulated conductors. This leakage may cause loss of life if the current is of high electromotive force; it may cause fire if the current flow is less than the amount required to melt the fuses; or if passing through moisture onto a concrete structure it may crack or disintegrate the concrete. Even on structural steel frame buildings it may destroy foundation plates and bolts and disintegrate water-soaked foundations of concrete or even of brick laid in mortar.

It has been found that wherever concrete is saturated with water containing more or less alkali, it furnishes an excellent conductor for the electrical current. The presence of lime and magnesia in cement provides sufficient alkali to make even the purest water soaking into the cement a good conductor. The addition of any salt, ammonia or acid to the water greatly increases its conductivity. The passage of any electric current through the saturated concrete tends to decompose the water and salts contained therein, producing at the positive pole oxygen in a nascent condition and releasing the acids contained in the salts. At the negative pole hydrogen is released and the alkalis of the salts. Owing to the cellular nature of the concrete structure, where reinforcement is not present, these gases appear to be released in all the little interstices of the concrete through which the current passes. The hydrogen does no damage, but the oxygen corrodes any iron reinforcement and appears to attack and disintegrate the concrete. This disintegration takes place quite rapidly under the continuous current of electricity, and less rapidly under an alternating current, at the same pressure.

My invention consists in making the concrete waterproof in and around the foundations of the structures where ordinarily the current leaking into the building would pass to the damp ground, and in making the concrete waterproof around or above the reinforcing elements in order to prevent the current leaking from conductors in the building from getting to the reinforcement.

In the accompanying drawings.

Figure 1:
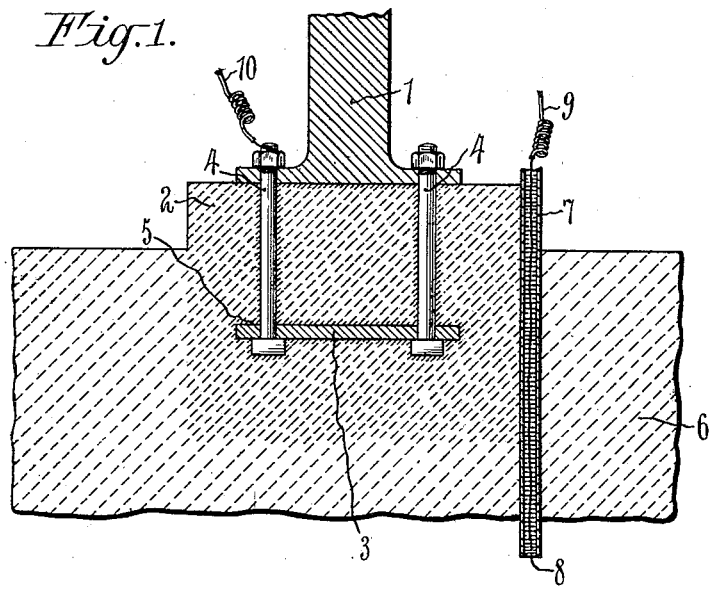
Figure 1 represents in section the lower end of a structural steel column joined to a foundation plate embedded in a cement foundation, together with a metal pipe for receiving a testing wire, and showing the concrete in proximity to the column and its fastenings, made water and moisture proof.

Referring to Fig. 1, the lower end of the structural steel column is represented by 1, the foundation to which it is joined, by 2, the anchoring plate embedded in the concrete foundation, by 3, and the bolts for connecting the foundation plate 3 and flange at the base of the column, by 4. The plate 3 and bolts 4 are first covered by a thin layer of waterproof concrete 5, jetted upon them or placed around them, and are then embedded in a thick mass of jetted waterproof concrete 2 on the subfoundation 6. The sub-foundation may be of ordinary mass concrete and so may the surrounding space between piers or walls. The upper surface, however, of the ordinary concrete 6, should be below the level of the waterproof jetted concrete 2. Into the concrete 6, there should be placed at intervales, metal pipes 7 closed at the bottom with a paper plug 8, to exclude the concrete while it is in a pliable mass and before setting. After the concrete is set, the pipes 7 can be filled with salt water into which a testing or ground wire 9 may be led.

The wire 9 can also be used to carry off dangerous current leaking into the structure above, by properly connecting it therewith.

A testing wire 10 may also be connected with one of the bolts 4 at the base of the column.

Figure 2:
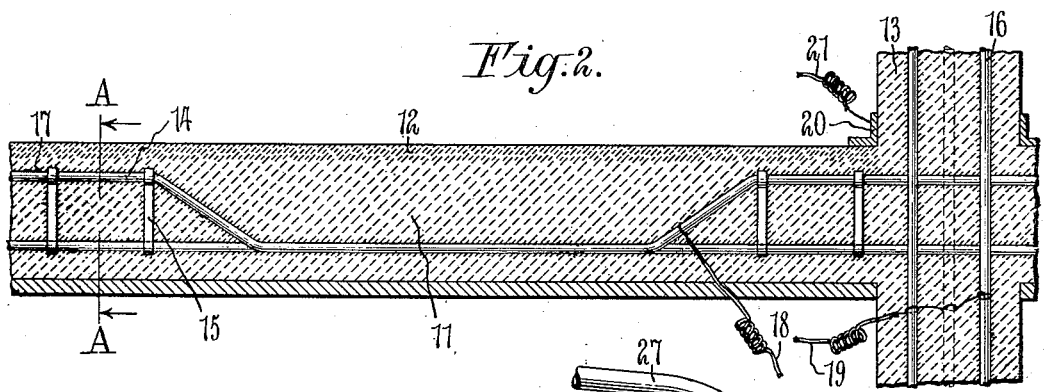
Fig. 2 is a view in longitudinal vertical section of a reinforced concrete beam and its connection with the column, showing the waterproof structure of the beam at the top and the insulated electrical conductors connected with the reinforcing elements and with a metallic ring or guard on the outside of the column.
Figure 3:
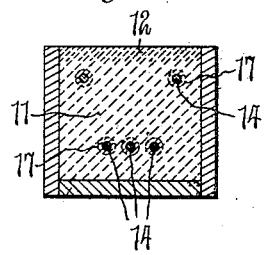
Fig. 3 is a cross section of the beam, in the plane of the line A—A of Fig. 2, showing the mold boards in position for molding the beam.

In the structure shown in Figs. 2 and 3, a concrete beam composed of ordinary mass concrete 11 and an upper layer of jetted waterproof concrete 12 are shown connected with a vertical column 13. The beam is shown provided with reinforcing elements, for instance, steel rods 14, extending lengthwise thereof and electrically connected by transverse strips 15. The column is also shown provided with reinforcing elements, for example, steel rods 16. Before embedding these reinforcing elements in the concrete, they are provided with a coating of jetted waterproof concrete 17. Electrical conductors 18, 19, lead from the beam reinforcing elements to the exterior and also from the column reinforcing elements to the exterior for the purposes of testing and announcing the presence of electric currents therein as will hereinafter more fully appear.

In Fig. 2 there is also shown a metallic ring or guard 20 surrounding the column 13, in proximity to the beam, and from this ring an electric conductor 21 leads for purposes of testing and announcing the presence of an electric current.

Figure 4:
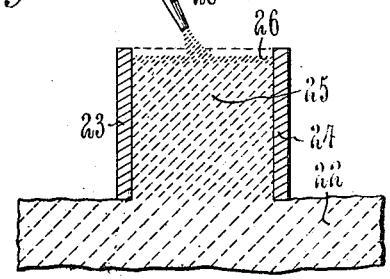
Fig. 4 illustrates a way of rendering the cement mass waterproof.

In Fig. 4, a foundation or sub-foundation 22 of ordinary coarse concrete or broken stone embedded in the concrete is shown and mold boards 23, 24, are supported thereon for the purpose of forming a wall or pier, the body of which, denoted by 25, may be made of coarse concrete or broken stone having jetted or placed thereon waterproof concrete to form a compact mass the surface of which, denoted by 26, may consist wholly of the waterproof concrete.

27 denotes a pipe provided with a nozzle 28, through which, under steam or other suitable pressure, the waterproof cement may be jetted on to the foundation mass for forming the beam. This jetted concrete penetrates the mass concrete or broken stone and mechanically tamps it so as to make it much denser and stronger after it sets as well as a much better resistant to water and other contact fluid than the ordinary tamped mass concrete.

The waterproof concrete above referred to may consist of one part of cement, three parts of sand and one-tenth part of waterproofing compound mixed with one-half to one part of water. The waterproof compound which I prefer to use is known in the art as "stare". It is a paste made by grinding an alkali, for example, slaked lime, in an asphaltic oil, to an impalpable powder and adding a tannic compound or its equivalent to render the paste miscible in water. This mixture is jetted at a pressure of from 30 to 60 lbs., the impact of the blow causing the concrete to adhere tightly to either the reinforcement or the broken stone or coarse concrete, driving out all bubbles and filling all voids, making a dense concrete of great strength which excludes water after setting and forms an excellent electrical insulator. A cubic foot of concrete made in this way weighs 148 pounds. The same when hand-tamped weighs but 120 pounds.

What I claim is:

1. The method of preventing the disintegration of reinforced concrete structures by electrolysis, consisting in jetting premixed waterproof concrete, together with the impelling fluid under high pressure, to wit: from thirty to sixty pounds pressure to the square inch, on the reinforcing element or elements of the concrete structure to form a dense waterproof coating thereon and subsequently embedding the said elements in mass concrete.

2. Means for preventing the disintegration of concrete structures and masses, including a metallic element, consisting of a layer of jetted concrete of such density as to render it waterproof, surrounding the metallic element and itself embedded in the concrete structure or mass.

In testimony, that I claim the foregoing as my invention, I have signed my name in presence of two witnesses, this sixth day of June 1912.

HAROLD P. BROWN.

Witnesses:
F. GEORGE BARRY,
HENRY C. THIEME.